United States Patent
Yerramalli et al.

(10) Patent No.: US 11,671,975 B2
(45) Date of Patent: Jun. 6, 2023

(54) CONFIGURATION FOR ONE-SHOT HYBRID AUTOMATIC REPEAT REQUEST (HARQ) FEEDBACK

(71) Applicant: QUALCOMM Incorporated, San Diego, CA (US)

(72) Inventors: Srinivas Yerramalli, Hyderabad (IN); Jing Sun, San Diego, CA (US); Xiaoxia Zhang, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 16/949,710

(22) Filed: Nov. 11, 2020

(65) Prior Publication Data

US 2021/0153172 A1    May 20, 2021

Related U.S. Application Data

(60) Provisional application No. 62/937,764, filed on Nov. 19, 2019.

(51) Int. Cl.
*H04W 72/23*    (2023.01)
*H04L 1/1812*    (2023.01)
*H04W 72/0453*    (2023.01)

(52) U.S. Cl.
CPC .......... *H04W 72/23* (2023.01); *H04L 1/1812* (2013.01); *H04W 72/0453* (2013.01)

(58) Field of Classification Search
CPC ... H04L 1/1671; H04L 1/1685; H04L 1/1812; H04L 1/1864; H04W 72/042; H04W 72/0453

See application file for complete search history.

(56) References Cited

U.S. PATENT DOCUMENTS 8,693,435 B2 * 4/2014 Terry ............... H04L 25/497
                                                    370/468
8,804,505 B2 * 8/2014 Malkamaki ......... H04W 28/06
                                                    370/335

(Continued)

FOREIGN PATENT DOCUMENTS

EP    4057537 A1 *  9/2022 ........... H04L 1/1854
EP    4057538 A1 *  9/2022 ........... H04L 1/1861

(Continued)

OTHER PUBLICATIONS

Zte et al., Remaining issues on scheduling and HARQ for NR-U, Nov. 18, 2019, 3GPP TSG RAN WG1 Meeting #99, Tdoc: R1-1911824 (Year: 2018).*

(Continued)

*Primary Examiner* — Eric Nowlin
(74) *Attorney, Agent, or Firm* — Harrity & Harrity, LLP/Qualcomm

(57) ABSTRACT

This disclosure provides systems, methods, and apparatus, including computer programs encoded on computer storage media, for one-shot hybrid automatic repeat request (HARQ) feedback for a user equipment (UE). In one aspect, a configuration of whether and in what circumstances a new data indicator (NDI) may be provided by the UE is disclosed. In another aspect, one or more rules for one-shot HARQ feedback reporting when the UE has received a semi-persistent scheduling (SPS) allocation release are disclosed.

30 Claims, 7 Drawing Sheets

(56) References Cited

U.S. PATENT DOCUMENTS

| | | | | |
|---|---|---|---|---|
| 9,319,946 | B2* | 4/2016 | Terry | H04N 9/7925 |
| 10,172,048 | B2* | 1/2019 | Terry | H04N 19/139 |
| 2014/0192779 | A1* | 7/2014 | Terry | H04N 21/426 |
| | | | | 370/331 |
| 2016/0219468 | A1* | 7/2016 | Terry | H04L 51/48 |
| 2019/0150139 | A1* | 5/2019 | Malkamaki | H04L 49/90 |
| | | | | 370/329 |
| 2020/0344012 | A1* | 10/2020 | Karaki | H04L 5/0055 |
| 2021/0105102 | A1* | 4/2021 | Li | H04L 1/1822 |
| 2021/0410155 | A1* | 12/2021 | Khoshnevisan | H04W 72/21 |
| 2022/0303064 | A1* | 9/2022 | Yang | H04L 5/0055 |
| 2022/0303100 | A1* | 9/2022 | Yang | H04L 1/1861 |

FOREIGN PATENT DOCUMENTS

| | | | | |
|---|---|---|---|---|
| KR | 20220049538 | A * | 4/2022 | |
| KR | 20220052329 | A * | 4/2022 | |
| WO | WO-2021087980 | A1 * | 5/2021 | |
| WO | WO-2021091251 | A1 * | 5/2021 | H04L 1/1854 |
| WO | WO-2021091258 | A1 * | 5/2021 | H04L 1/1861 |

OTHER PUBLICATIONS

Huawei et al., HARQ enhancement in NR unlicensed, Nov. 18, 2019, 3GPP TSG RAN WG1 Meeting #99, Tdoc: R1-1911868 (Year: 2018).*

Beijing Xiaomi Mobile Software, Discussion on HARQ enhancement for NR-U, Nov. 18, 2019, 3GPP TSG RAN WG1 Meeting #99, Tdoc: R1-1911992 (Year: 2018).*

Vivo, Discussion on HARQ operation for NR-U, Nov. 18, 2019, 3GPP TSG RAN WG1 Meeting #99, Tdoc: R1-1912014 (Year: 2018).*

Fujitsu, HARQ enhancements for NR-U, Nov. 18, 2019, 3GPP TSG RAN WG1 Meeting #99, Tdoc: R1-1912076 (Year: 2018 ).*

MediaTek Inc., Remaining details on HARQ and scheduling for NR-U operation, Nov. 18, 2019, 3GPP TSG RAN WG1 Meeting #99, Tdoc: R1-1912090 (Year: 2018).*

Intel Corporation, Enhancements to HARQ for NR-unlicensed, Nov. 18, 2019, 3GPP TSG RAN WG1 Meeting #99, Tdoc: R1-1912199 (Year: 2018).*

Nokia et al., Remaining details on NR-U HARQ scheduling and feedback, Nov. 18, 2019, 3GPP TSG RAN WG1 Meeting #99, Tdoc: R1-1912261 (Year: 2018).*

Lenovo et al., HARQ enhancement for NR-U, Nov. 18, 2019, 3GPP TSG RAN WG1 Meeting #99, Tdoc: R1-1912328 (Year: 2018).*

LG Electronics, HARQ procedure for NR-U, Nov. 18, 2019, 3GPP TSG RAN WG1 Meeting #99, Tdoc: R1-1912391 (Year: 2018).*

Oppo, HARQ enhancements for NR-U, Nov. 18, 2019, 3GPP TSG RAN WG1 Meeting #99, Tdoc: R1-1912508 (Year: 2018).*

NEC, HARQ enhancement for NR-U, Nov. 18, 2019, 3GPP TSG RAN WG1 Meeting #99, Tdoc: R1-1912624 (Year: 2018).*

Interdigital, Inc., Enhanced dynamic HARQ codebook for NR-U, Nov. 18, 2019, 3GPP TSG RAN WG1 Meeting #99, Tdoc: R1-1912698 (Year: 2018).*

Ericsson, HARQ and scheduling enhancements for NR-U, Nov. 18, 2019, 3GPP TSG RAN WG1 Meeting #99, Tdoc: R1-1912711 (Year: 2018).*

Sharp, HARQ enhancement for NR unlicensed operation, Nov. 18, 2019, 3GPP TSG RAN WG1 Meeting #99, Tdoc: R1-1912766 (Year: 2018).*

Panasonic Corporation, HARQ enhancement for NR-U, Nov. 18, 2019, 3GPP TSG RAN WG1 Meeting #99, Tdoc: R1-1912771 (Year: 2018).*

Apple Inc., HARQ and scheduling enhancement for NR-U, Nov. 18, 2019, 3GPP TSG RAN WG1 Meeting #99, Tdoc: R1-1912807 (Year: 2018).*

Itri, Remaining issues of HARQ enhancements for NR-U, Nov. 18, 2019, 3GPP TSG RAN WG1 Meeting #99, Tdoc: R1-1912858 (Year: 2018).*

NTT Docomo, Inc., HARQ enhancement for NR-U, Nov. 18, 2019, 3GPP TSG RAN WG1 Meeting #99, Tdoc: R1-1912876 (Year: 2018).*

Caict, Discussions on HARQ enhancements in NR-U, Nov. 18, 2019, 3GPP TSG RAN WG1 Meeting #99, Tdoc: R1-1913028 (Year: 2018).*

International Search Report and Written Opinion—PCT/US2020/070776—ISA/EPO—dated May 10, 2021.

Partial International Search Report—PCT/US2020/070776—ISA/EPO—dated Mar. 16, 2021.

* cited by examiner

CONFIGURATION FOR ONE-SHOT HYBRID AUTOMATIC REPEAT REQUEST (HARQ) FEEDBACK

CROSS-REFERENCE TO RELATED APPLICATION

This Patent Application claims priority to U.S. Provisional Patent Application No. 62/937,764, filed on Nov. 19, 2019, entitled "CONFIGURATION FOR ONE-SHOT HYBRID AUTOMATIC REPEAT REQUEST (HARQ) FEEDBACK," and assigned to the assignee hereof. The disclosure of the prior Application is considered part of and is incorporated by reference into this Patent Application.

TECHNICAL FIELD

Aspects of the present disclosure relate generally to wireless communication and to techniques for a configuration for one-shot hybrid automatic repeat request (HARQ) feedback.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, a 5G NodeB, or the like.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by a user equipment (UE). The method may include receiving an indication of whether a new data indicator (NDI) is to be provided in connection with one-shot hybrid automatic repeat request (HARQ) feedback triggered for a HARQ process; and selectively providing the NDI with the one-shot HARQ feedback in accordance with the indication.

In some implementations, the indication is received in radio resource control (RRC) information.

In some implementations, the indication is received in a medium access control (MAC) control element (CE).

In some implementations, the indication is received in a grant associated with a transmission for which the one-shot HARQ feedback is provided.

In some implementations, the indication indicates that the NDI is to be carried in a physical uplink shared channel.

In some implementations, the indication indicates that the NDI is to be carried in a physical uplink control channel.

In some implementations, the indication indicates a carrier or bandwidth part for which the NDI is to be provided.

In some implementations, the indication indicates that the NDI is to be provided when a threshold number of carriers is activated for the UE.

In some implementations, the indication indicates that the NDI is to be provided when a threshold number of unlicensed carriers is activated for the UE.

In some implementations, the indication indicates that the NDI is to be provided for a type of uplink shared channel.

In some implementations, the indication indicates that the NDI is to be provided for a format of uplink shared channel.

In some implementations, the indication indicates that the NDI is to be provided for one or more HARQ configurations.

In some implementations, the indication indicates that the NDI is to be provided when the UE is configured with a rank that is lower than a threshold.

Another innovative aspect of the subject matter described in this disclosure can be implemented in an apparatus of a UE for wireless communication. The apparatus may include a first interface configured to obtain an indication of whether an NDI is to be provided in connection with one-shot HARQ feedback triggered for a HARQ process, and a processing system configured to selectively provide the NDI with the one-shot HARQ feedback in accordance with the indication.

In some implementations, the indication is received in RRC information.

In some implementations, the indication is received in a MAC CE.

In some implementations, the indication is received in a grant associated with a transmission for which the one-shot HARQ feedback is provided.

In some implementations, the indication indicates that the NDI is to be carried in a physical uplink shared channel.

In some implementations, the indication indicates that the NDI is to be carried in a physical uplink control channel.

In some implementations, the indication indicates a carrier or bandwidth part for which the NDI is to be provided.

In some implementations, the indication indicates that the NDI is to be provided when a threshold number of carriers is activated for the UE.

In some implementations, the indication indicates that the NDI is to be provided when a threshold number of unlicensed carriers is activated for the UE.

In some implementations, the indication indicates that the NDI is to be provided for a type of uplink shared channel.

In some implementations, the indication indicates that the NDI is to be provided for a format of uplink shared channel.

In some implementations, the indication indicates that the NDI is to be provided for one or more HARQ configurations.

In some implementations, the indication indicates that the NDI is to be provided when the UE is configured with a rank that is lower than a threshold.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive an indication of whether an NDI is to be provided in connection with one-shot HARQ feedback triggered for a HARQ process; and selectively providing the NDI with the one-shot HARQ feedback in accordance with the indication.

In some implementations, the indication is received in RRC information.

In some implementations, the indication is received in a MAC CE.

In some implementations, the indication is received in a grant associated with a transmission for which the one-shot HARQ feedback is provided.

In some implementations, the indication indicates that the NDI is to be carried in a physical uplink shared channel.

In some implementations, the indication indicates that the NDI is to be carried in a physical uplink control channel.

In some implementations, the indication indicates a carrier or bandwidth part for which the NDI is to be provided.

In some implementations, the indication indicates that the NDI is to be provided when a threshold number of carriers is activated for the UE.

In some implementations, the indication indicates that the NDI is to be provided when a threshold number of unlicensed carriers is activated for the UE.

In some implementations, the indication indicates that the NDI is to be provided for a type of uplink shared channel.

In some implementations, the indication indicates that the NDI is to be provided for a format of uplink shared channel.

In some implementations, the indication indicates that the NDI is to be provided for one or more HARQ configurations.

In some implementations, the indication indicates that the NDI is to be provided when the UE is configured with a rank that is lower than a threshold.

Another innovative aspect of the subject matter described in this disclosure can be implemented in an apparatus for wireless communication. The apparatus may include means for receiving an indication of whether an NDI is to be provided in connection with one-shot HARQ feedback triggered for a HARQ process; and means for selectively providing the NDI with the one-shot HARQ feedback in accordance with the indication.

In some implementations, the indication is received in RRC information.

In some implementations, the indication is received in a MAC CE.

In some implementations, the indication is received in a grant associated with a transmission for which the one-shot HARQ feedback is provided.

In some implementations, the indication indicates that the NDI is to be carried in a physical uplink shared channel.

In some implementations, the indication indicates that the NDI is to be carried in a physical uplink control channel.

In some implementations, the indication indicates a carrier or bandwidth part for which the NDI is to be provided.

In some implementations, the indication indicates that the NDI is to be provided when a threshold number of carriers is activated for the UE.

In some implementations, the indication indicates that the NDI is to be provided when a threshold number of unlicensed carriers is activated for the UE.

In some implementations, the indication indicates that the NDI is to be provided for a type of uplink shared channel.

In some implementations, the indication indicates that the NDI is to be provided for a format of uplink shared channel.

In some implementations, the indication indicates that the NDI is to be provided for one or more HARQ configurations.

In some implementations, the indication indicates that the NDI is to be provided when the UE is configured with a rank that is lower than a threshold.

Another innovative aspect of the subject matter described in this disclosure can be implemented in a method of wireless communication performed by a UE. The method may include receiving a request for one-shot HARQ feedback, where the UE is configured with a reporting occasion for a SPS release; and transmitting the one-shot HARQ feedback based on the UE being configured with the reporting occasion for the SPS release; or performing the one-shot HARQ feedback using a modified codebook based on the UE being configured with the SPS release.

In some implementations, the method includes outputting the one-shot HARQ feedback omitting feedback regarding the SPS release based on the UE being configured with the reporting occasion for the SPS release.

In some implementations, a bit is appended to a semi-static HARQ feedback codebook to form the modified codebook.

In some implementations, the bit is toggled based on the SPS release having been detected by the UE.

In some implementations, the bit is used for a number of slots after the SPS release is detected.

In some implementations, the one-shot HARQ feedback indicates a negative acknowledgment if the UE has already reported HARQ feedback for the SPS release using the reporting occasion.

In some implementations, the one-shot HARQ feedback includes an acknowledgment based on the SPS release being detected and based on the reporting occasion being included in a same slot as a reporting occasion of the one-shot HARQ feedback.

Another innovative aspect of the subject matter described in this disclosure can be implemented in an apparatus of a UE for wireless communication. The apparatus may include a first interface configured to obtain a request for one-shot HARQ feedback, where the UE is configured with a reporting occasion for a SPS release; and the first interface or a second interface configured to output the one-shot HARQ feedback based on the UE being configured with the reporting occasion for the SPS release, or to perform the one-shot HARQ feedback using a modified codebook based on the UE being configured with the SPS release.

In some implementations, the first interface or the second interface is further configured to output the one-shot HARQ feedback omitting feedback regarding the SPS release based on the UE being configured with the reporting occasion for the SPS release.

In some implementations, a bit is appended to a semi-static HARQ feedback codebook to form the modified codebook.

In some implementations, the bit is toggled based on the SPS release having been detected by the UE.

In some implementations, the bit is used for a number of slots after the SPS release is detected.

In some implementations, the one-shot HARQ feedback indicates a negative acknowledgment if the UE has already reported HARQ feedback for the SPS release using the reporting occasion.

In some implementations, the one-shot HARQ feedback includes an acknowledgment based on the SPS release being detected and based on the reporting occasion being included in a same slot as a reporting occasion of the one-shot HARQ feedback.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive a request for one-shot HARQ feedback, where the UE is configured with a reporting occasion for a SPS release; and transmit the one-shot HARQ feedback based on the UE being configured with the reporting occasion for the SPS release; or perform the one-shot HARQ feedback using a modified codebook based on the UE being configured with the SPS release.

In some implementations, the UE is further configured to output the one-shot HARQ feedback omitting feedback regarding the SPS release based on the UE being configured with the reporting occasion for the SPS release.

In some implementations, a bit is appended to a semi-static HARQ feedback codebook to form the modified codebook.

In some implementations, the bit is toggled based on the SPS release having been detected by the UE.

In some implementations, the bit is used for a number of slots after the SPS release is detected.

In some implementations, the one-shot HARQ feedback indicates a negative acknowledgment if the UE has already reported HARQ feedback for the SPS release using the reporting occasion.

In some implementations, the one-shot HARQ feedback includes an acknowledgment based on the SPS release being detected and based on the reporting occasion being included in a same slot as a reporting occasion of the one-shot HARQ feedback.

Another innovative aspect of the subject matter described in this disclosure can be implemented in an apparatus for wireless communication. The apparatus may include means for receiving a request for one-shot HARQ feedback, where the apparatus is configured with a reporting occasion for a SPS release; and means for transmitting the one-shot HARQ feedback based on the apparatus being configured with the reporting occasion for the SPS release; or means for performing the one-shot HARQ feedback using a modified codebook based on the apparatus being configured with the SPS release.

In some implementations, the apparatus includes means for transmitting the one-shot HARQ feedback omitting feedback regarding the SPS release based on the UE being configured with the reporting occasion for the SPS release.

In some implementations, a bit is appended to a semi-static HARQ feedback codebook to form the modified codebook.

In some implementations, the bit is toggled based on the SPS release having been detected by the UE.

In some implementations, the bit is used for a number of slots after the SPS release is detected.

In some implementations, the one-shot HARQ feedback indicates a negative acknowledgment if the UE has already reported HARQ feedback for the SPS release using the reporting occasion.

In some implementations, the one-shot HARQ feedback includes an acknowledgment based on the SPS release being detected and based on the reporting occasion being included in a same slot as a reporting occasion of the one-shot HARQ feedback.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
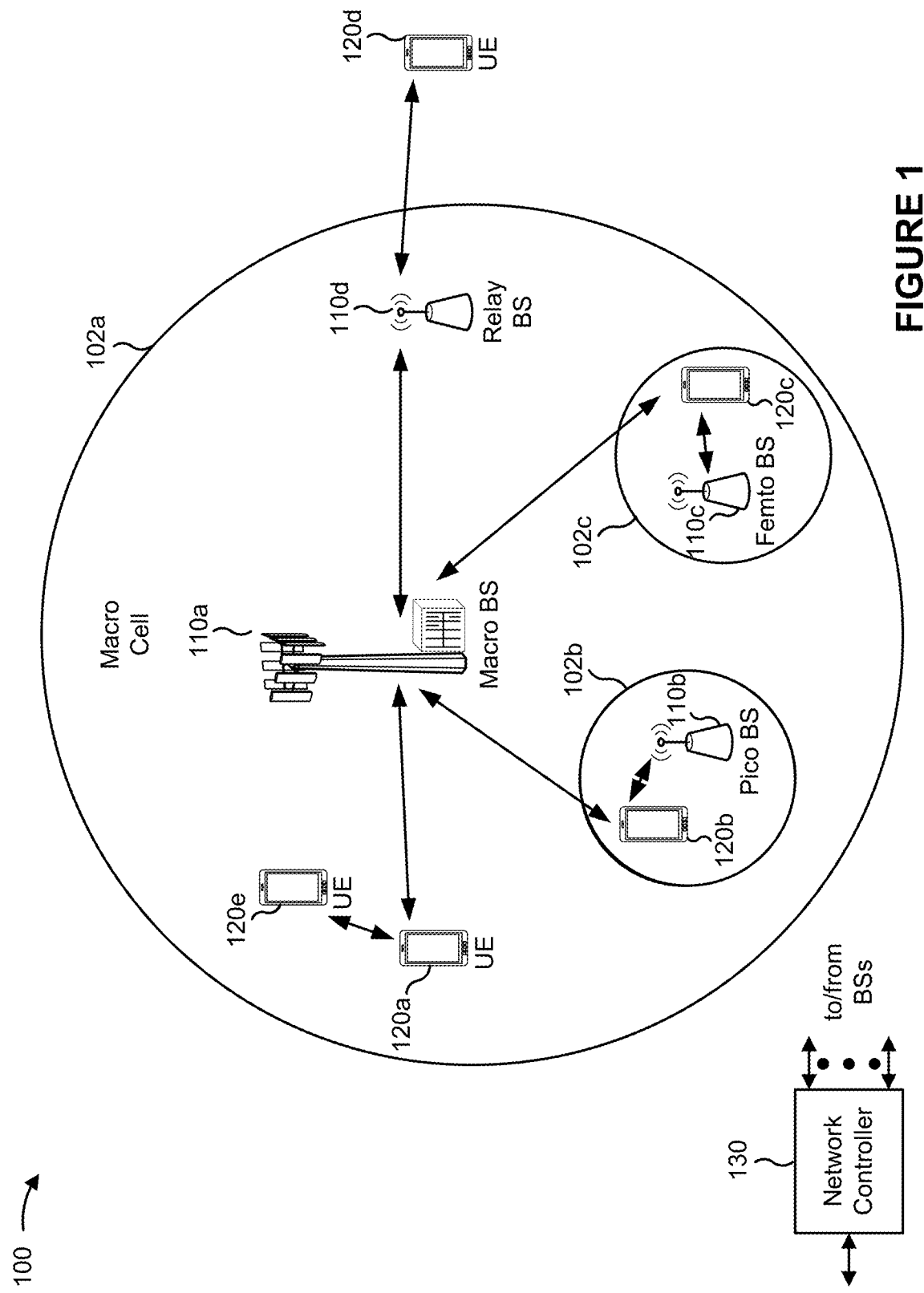
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Some wireless communication deployments may use unlicensed spectrum for wireless communication. One example is a New Radio Unlicensed (NR-U) deployment, in which user equipments (UEs) and base stations (BSs) may secure channel access using a listen-before-talk or listen-before-transmit (LBT) operation. In such a deployment, channel access may be uncertain since a UE or a BS may fail the LBT operation and thus not be permitted to perform a transmission at an expected time.

Hybrid automatic repeat request (HARQ) feedback provides a way for a receiver to signal whether the receiver has successfully received information transmitted by a transmitter. A UE and a base station may maintain respective HARQ configurations, and may selectively retransmit information based on results of HARQ procedures. A transmission or resource may be associated with a HARQ process (such as a HARQ process identifier) that may be used to differentiate HARQ feedback associated with the transmission or resource from HARQ feedback associated with other transmissions or resources. HARQ feedback from a UE may be provided via uplink control information (UCI), which can be provided on a physical uplink control channel (PUCCH) or a physical uplink shared channel (PUSCH).

In an unlicensed deployment or an unlicensed carrier in a licensed assisted deployment, a UE or base station may be capable of requesting HARQ feedback for a specific set of transmissions or resources (such as a specific HARQ process or a set of HARQ processes). Furthermore, a UE or base station may be capable of requesting all HARQ feedback for multiple HARQ processes, which may be referred to herein as one-shot HARQ feedback or a one-shot ACK/NACK trigger. This may be useful, for example, in the situation when a base station receives neither an acknowledgment (ACK) nor negative ACK (HACK) for a downlink communication, when the base station is associated with poor coverage, or when the base station expects not to acquire sufficient channel access to receive individual HARQ feedback for multiple HARQ processes. In the case of a failed ACK/NACK transmission, the base station may not know whether the ACK/NACK was not received because a UE did not receive the downlink communication (such as a missed control channel indicating the presence of a transmission, etc.), or because the UE successfully received the downlink communication and failed to transmit the ACK/NACK. For example, the UE may fail to transmit the ACK/NACK based on failing to secure channel access using an LBT operation.

A new data indicator (NDI) may be associated with a HARQ transmission. An NDI indicates, to the base station, whether a UE is responding to a current transmission or to a previous transmission. In some implementations, the NDI may be toggled for an upcoming transmission, if the HARQ feedback provided by the UE indicating a transmission has been successfully decoded is received at the base station. For example, if the NDI includes a single bit, the single bit may be toggled from one to zero or from zero to one each time the UE successfully transmits an ACK, and the ACK is successfully received at the base station. Thus, the base station can determine whether the base station has missed an ACK/NACK based on whether the NDI, as observed by the base station, has skipped an expected value.

In unlicensed spectrum, since the transmission of the ACK by the UE is not guaranteed, a mechanism to selectively request the ACK/NACK status of specified HARQ processes may be implemented. This mechanism, as mentioned above, may be termed a one-shot HARQ feedback request or a one-shot ACK/NACK trigger request. If the UE has not received, or missed, the latest transmission corresponding to the HARQ process, the UE may reply with the ACK/NACK status from a previous transmission associated with the HARQ processes. To overcome this, the NDI bit(s) signaled in the downlink grant to the UE may be provided in the UL HARQ-ACK to enable the BS to determine which transmission the UE is responding to. However, in general, reporting the NDI can increase the payload to be carried on the uplink control channel and thus may adversely impact resource usage or power usage. In such scenarios, the addition of NDI to the uplink HARQ-ACK transmission may be enabled selectively, for example, by base station configuration.

A semi-persistent scheduling (SPS) configuration may be used to provide a recurring resource allocation for communications by a UE. An SPS resource allocation may be released based on an SPS release, which may be carried by downlink control information (DCI). The UE may provide an ACK/NACK for the SPS release on a reporting occasion. In some circumstances, the UE also may provide one-shot HARQ feedback on a reporting occasion (such as the same reporting occasion or a different reporting occasion). There may be ambiguity regarding how ACK/NACK feedback for an SPS release and one-shot HARQ feedback interact, and how the UE may handle these forms of feedback when these forms of feedback overlap with each other.

Some techniques and apparatuses described herein provide configuration of whether a UE may report an NDI and conditions for reporting the NDI in association with one-shot HARQ feedback. The conditions for reporting the NDI may relate to, for example, a channel for reporting the NDI, a carrier for reporting the NDI, a bandwidth part for reporting the NDI, a grant type or control channel format for which the NDI is being reported, a HARQ-process-specific condition for reporting the NDI, or a multiple-input multiple-output (MIMO) mode-based condition for reporting the NDI.

Furthermore, some techniques and apparatuses described herein provide configurations for handling ambiguity in one-shot HARQ feedback and SPS feedback. For example, some techniques and apparatuses described herein provide for the SPS feedback not to be reported when the one-shot HARQ feedback is requested. As another example, some techniques and apparatuses described herein provide for a modified codebook, such as a codebook including an appended bit, to be used for the one-shot HARQ feedback. The appended bit may be used to indicate results of decoding the SPS release or other information, described elsewhere herein.

Particular implementations of the subject matter described in this disclosure can be implemented to realize one or more of the following potential advantages. Increased flexibility in configuration of UEs may be achieved by selectively configuring the NDI to be provided. This may conserve computing resources for UEs for which the NDI is not configured, and may enable more robust HARQ feedback for UEs for which the NDI is configured. Furthermore, coexistence of one-shot HARQ feedback and SPS release feedback may be improved, which in turn, may reduce computing resource usage associated with providing individual HARQ feedback for the one-shot HARQ feedback and for the SPS release. This also may reduce the likelihood of misinterpreting HARQ feedback and thereby diminishing throughput and reliability.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 watts) whereas pico BSs, femto BSs, and relay BSs may have lower transmit power levels (for example, 0.1 to 2 watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
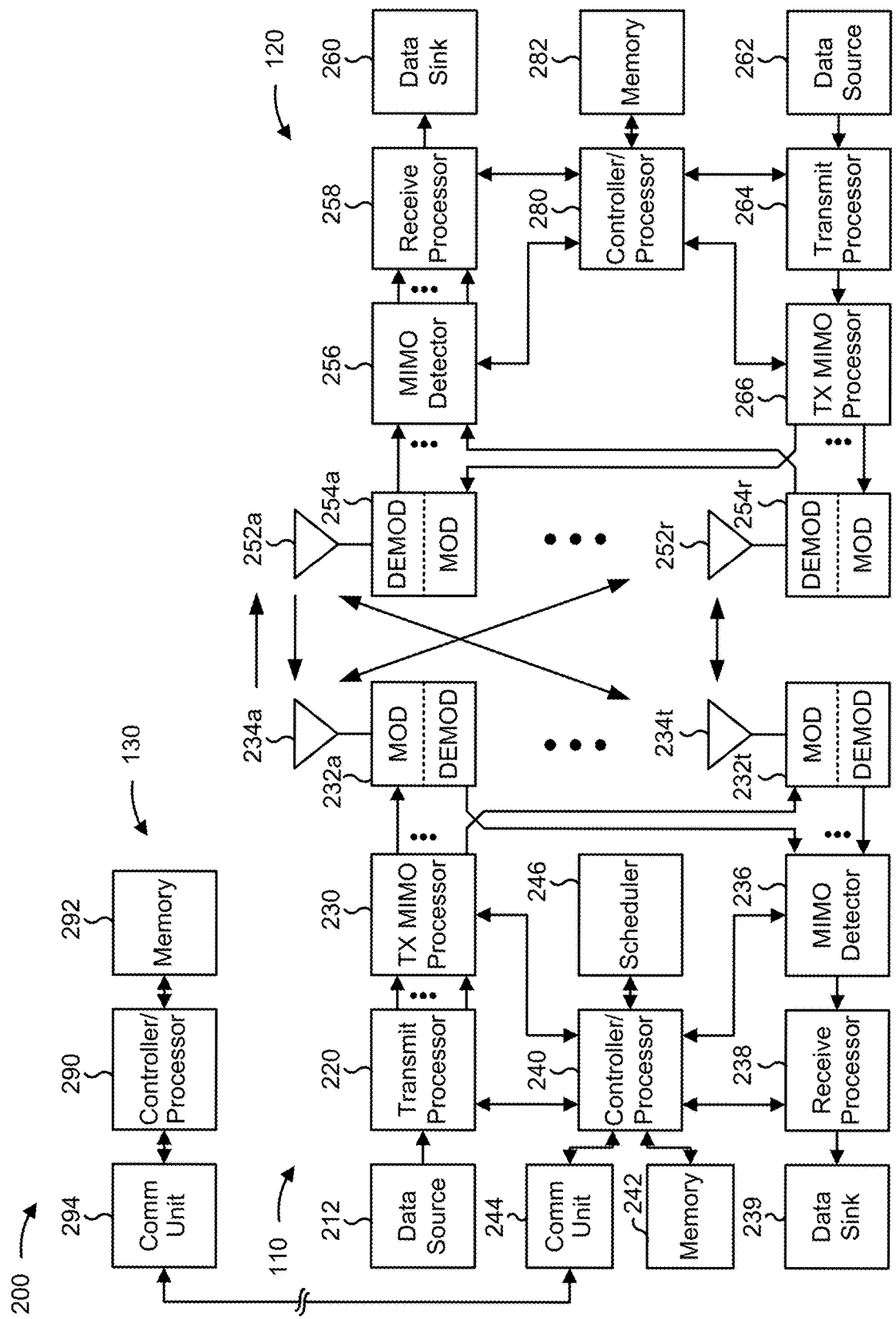
FIG. 2 is a block diagram conceptually illustrating an example of a base station (BS) in communication with a user equipment (UE) in a wireless network.

FIG. 2 is a block diagram conceptually illustrating an example 200 of a base station 110 in communication with a UE 120. In some aspects, base station 110 and UE 120 may respectively be one of the base stations and one of the UEs in wireless network 100 of FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

In some implementations, controller/processor 280 may be a component of a processing system. A "processing system" may generally refer to a system or series of machines or components that receives inputs and processes the inputs to produce a set of outputs (which may be passed to other systems or components of, for example, the UE 120). For example, a "processing system of the UE 120" may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface configured to output, transmit or provide information, and a second interface configured to receive or obtain information. In some cases, the second interface may be an interface between the processing system of the chip or modem and a receiver, such that the UE 120 may receive information or signal inputs, and the information may be passed to the processing system. In some cases, the first interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, controller/processor 240 may be a component of a processing system. As noted above, a processing system may generally be a system or series of machines or components that receives inputs and processes the inputs to produce a set of outputs (which may be passed to other systems or components of, for example, the BS 110). For example, a processing system of the BS 110 may be a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface configured to output, transmit or provide information, and a second interface configured to receive or obtain information. In some cases, the second interface may be an interface between the processing system of the chip or modem and a receiver, such that the BS 110 may receive information or signal inputs, and the information may be passed to the processing system. In some cases, the second interface may be an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

The controller/processor 240 of base station 110, the controller/processor 280 of UE 120, or any other component(s) of FIG. 2 may perform one or more techniques associated with configuration for one-shot HARQ feedback, as described in more detail elsewhere herein. For example, the controller/processor 240 of base station 110, the controller/processor 280 of UE 120, or any other component(s) (or combinations of components) of FIG. 2 may perform or direct operations of, for example, process 600 of FIG. 6, process 700 of FIG. 7, or other processes as described herein. The memories 242 and 282 may store data and program codes for base station 110 and UE 120, respectively. A scheduler 246 may schedule UEs for data transmission on the downlink, the uplink, or a combination thereof.

Figure 6:
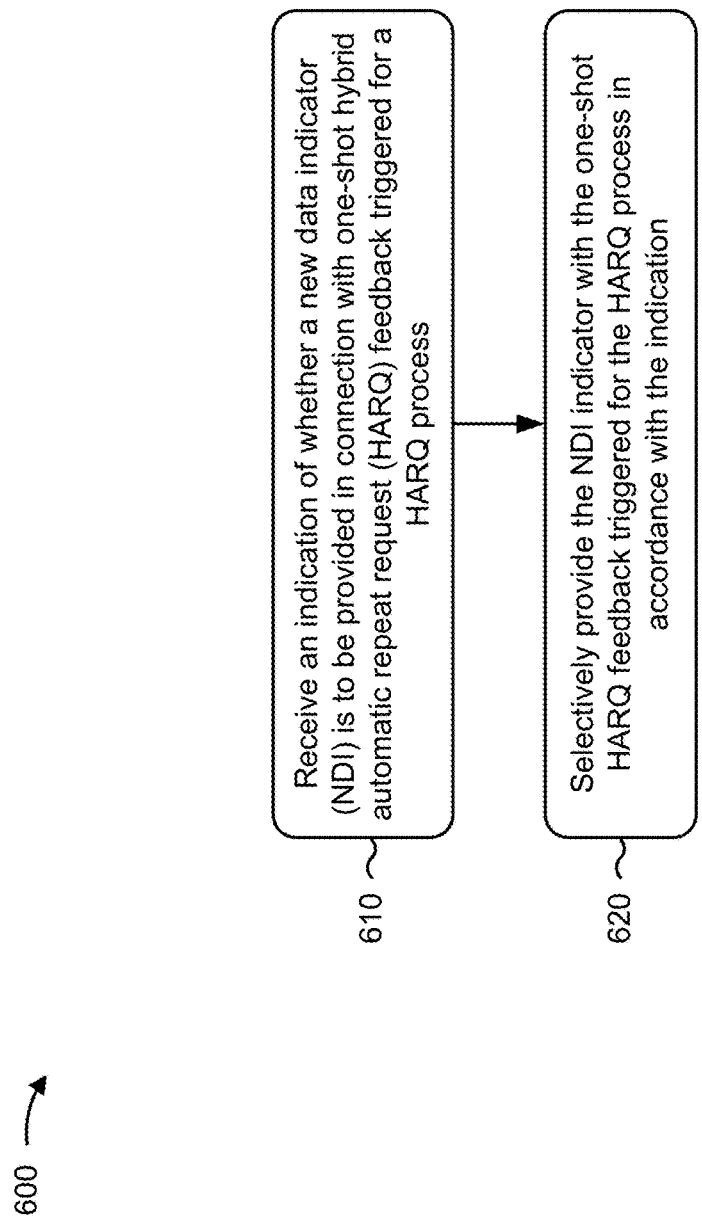
FIG. 6 is a diagram illustrating an example process performed, for example, by a UE.
Figure 7:
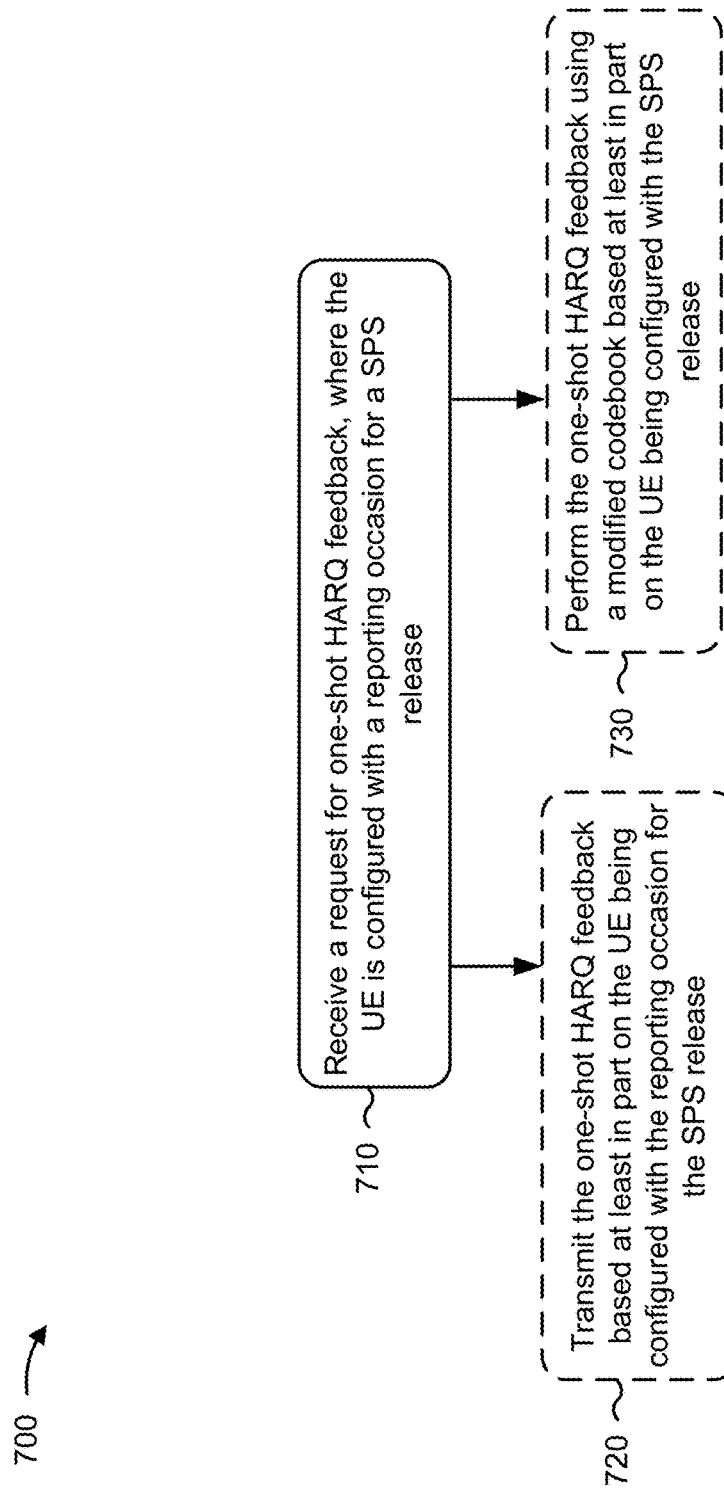
FIG. 7 is a diagram illustrating an example process performed, for example, by a UE.

The UE 120 may include means for performing one or more operations described herein, such as the process 600 of FIG. 6, the process 700 of FIG. 7, or other processes as described herein. In some aspects, such means may include one or more components of UE 120 described in connection with FIG. 2. The base station 110 may include means for performing one or more operations described herein, such as the process 600 of FIG. 6, the process 700 of FIG. 7, or other processes as described herein. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
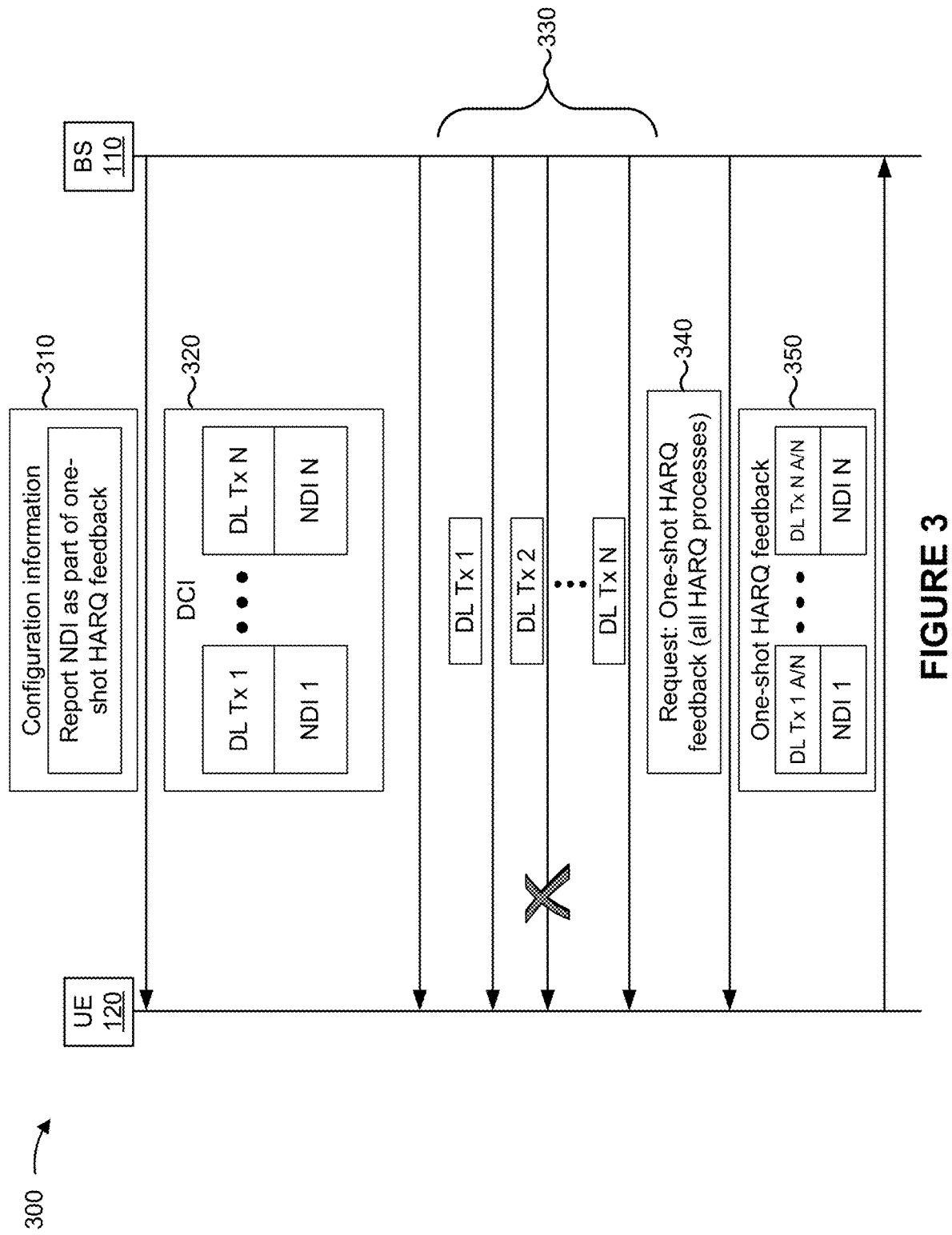
FIG. 3 is a diagram illustrating an example of configuration of a new data indicator (NDI) reporting scheme for one-shot hybrid automatic repeat request (HARQ) feedback.

FIG. 3 is a diagram illustrating an example 300 of configuration of an NDI reporting scheme for one-shot HARQ feedback. As shown, the example 300 includes a UE 120 and a BS 110 (such as the UE 120 and the BS 110 depicted in, and described in connection with, FIGS. 1 and 2).

As shown by reference number 310, the UE 120 may receive configuration information from the BS 110. The configuration information may indicate whether the UE is to report an NDI as part of one-shot HARQ feedback triggered for a HARQ process. For example, the configuration information may include an indication of whether an NDI is to be provided in connection with one-shot HARQ feedback triggered for a HARQ process. In example 300, the configuration information indicates to provide the NDI as part of the one-shot HARQ feedback. "One-shot HARQ feedback" refers to HARQ feedback triggered for a particular HARQ process or a group of HARQ processes (such as a subset of HARQ processes configured for a UE or all HARQ processes configured for a UE). One-shot HARQ feedback for a group of HARQ processes may be provided in a single transmission, such as a single HARQ codebook or a single UCI.

In some aspects, the configuration information may include radio resource control (RRC) information. In some aspects, the configuration information may include a medium access control (MAC) signal such as a MAC control element (CE). For example, the indication may be provided in a MAC CE. In some aspects, the indication may be provided in a grant associated with a transmission for which the one-shot HARQ feedback is provided. For example, the transmission may be associated with the HARQ process for which the one-shot HARQ feedback is triggered.

In some aspects, the configuration of whether to transmit the NDI may be based on a channel that will carry the one-shot HARQ feedback. For example, the configuration information may indicate whether an NDI may be transmitted when the one-shot HARQ feedback is provided via a PUSCH (since UCI on a PUSCH may be associated with a higher payload capacity than UCI on a PUCCH). As another example, the configuration information may indicate whether an NDI may be transmitted when the one-shot HARQ feedback is provided via a PUCCH.

In some aspects, the configuration of whether to transmit the NDI may be based on a carrier or bandwidth part (BWP) associated with the one-shot HARQ feedback. For example, the configuration information may be carrier-specific or BWP-specific. More particularly, the UE 120 may be configured to provide an NDI for a downlink transmission on a particular carrier or BWP, or may be configured not to provide the NDI for the downlink transmission on the particular carrier or BWP. Thus, provision of the NDI can be enabled for some BWPs or carriers and disabled for other BWPs or carriers. In some aspects, the configuration information may indicate that the UE 120 is to provide the NDI when the UE 120 is activated with at least N carriers (where N is a number greater than zero), or when the UE is 120 activated with at least one unlicensed carrier.

In some aspects, the configuration of whether to transmit the NDI may be based on a grant type or a format type associated with the DCI. For example, the configuration information may indicate whether to transmit an NDI for a triggered PUSCH. As another example, the configuration information may indicate whether to transmit an NDI for a configured grant PUSCH. Similarly, the configuration information may indicate whether to transmit an NDI for a particular PUCCH format or a particular group of PUCCH formats.

In some aspects, the configuration of whether to transmit the NDI may be specific to a HARQ process. For example, the configuration information may indicate whether to transmit an NDI for a particular HARQ process or a particular group of HARQ processes. In some aspects, the configuration of whether to transmit the NDI may be specific to a multiple input multiple output (MIMO) process. For example, the configuration information may indicate to transmit an NDI if the UE 120 is configured with up to a rank of 4 (in which case the UE 120 can transmit one-shot HARQ feedback using a single codeword) and not to transmit an NDI if the UE 120 is configured with a rank greater than 4.

As shown by reference number 320, the BS 110 may transmit DCI scheduling a plurality of downlink transmissions (DL Tx). As further shown, each DCI, of the DCI that schedules the plurality of downlink transmissions, may be associated with a respective NDI. For example, an NDI may indicate whether a corresponding downlink transmission is an initial transmission of a transport block (TB) or a retransmission of the TB. The DCI also may include information indicating respective resource allocations associated with the plurality of downlink transmissions.

As shown by reference number 330, the BS 110 may transmit the plurality of downlink transmissions. For example, the BS 110 may transmit the plurality of downlink transmissions using respective resource allocations indicated by the DCI. As further shown, the UE 120 may fail to receive one or more downlink transmissions of the plurality of downlink transmissions. In example 300, an X on a downlink transmission indicates that the UE 120 fails to receive the downlink transmission. The UE 120 may fail to receive a downlink transmission based on failing to receive a corresponding DCI, or based on successfully receiving the corresponding DCI and failing to detect or decode the downlink transmission.

As shown by reference number 340, the BS 110 may transmit a request for one-shot HARQ feedback. In example 300, the request for one-shot HARQ feedback is for all HARQ processes associated with the plurality of downlink transmissions. In some aspects, the request for one-shot HARQ feedback may be for a subset of the HARQ processes associated with the plurality of downlink transmissions, such as one or more HARQ processes.

As shown by reference number 350, the UE 120 may transmit one-shot HARQ feedback for the plurality of downlink transmissions. For example, the UE 120 may transmit the one-shot HARQ feedback for the plurality of HARQ processes associated with the plurality of downlink transmissions. As shown, based on the configuration information, the one-shot HARQ feedback indicates respective NDIs associated with the plurality of downlink transmissions. Furthermore, the one-shot HARQ feedback indicates respective ACK/NACKs (A/N) associated with the plurality of downlink transmissions. By providing the respective NDIs as part of the one-shot HARQ feedback, the UE 120 enables the BS 110 to determine whether the UE 120 failed to receive a downlink transmission due to a failure to receive the downlink transmission itself or due to a failure to receive DCI scheduling the downlink transmission. Thus, the BS 110 can more efficiently allocate downlink communication resources, more intelligently schedule retransmissions of downlink transmissions or DCI, and improve efficiently of network communications.

Figure 4:
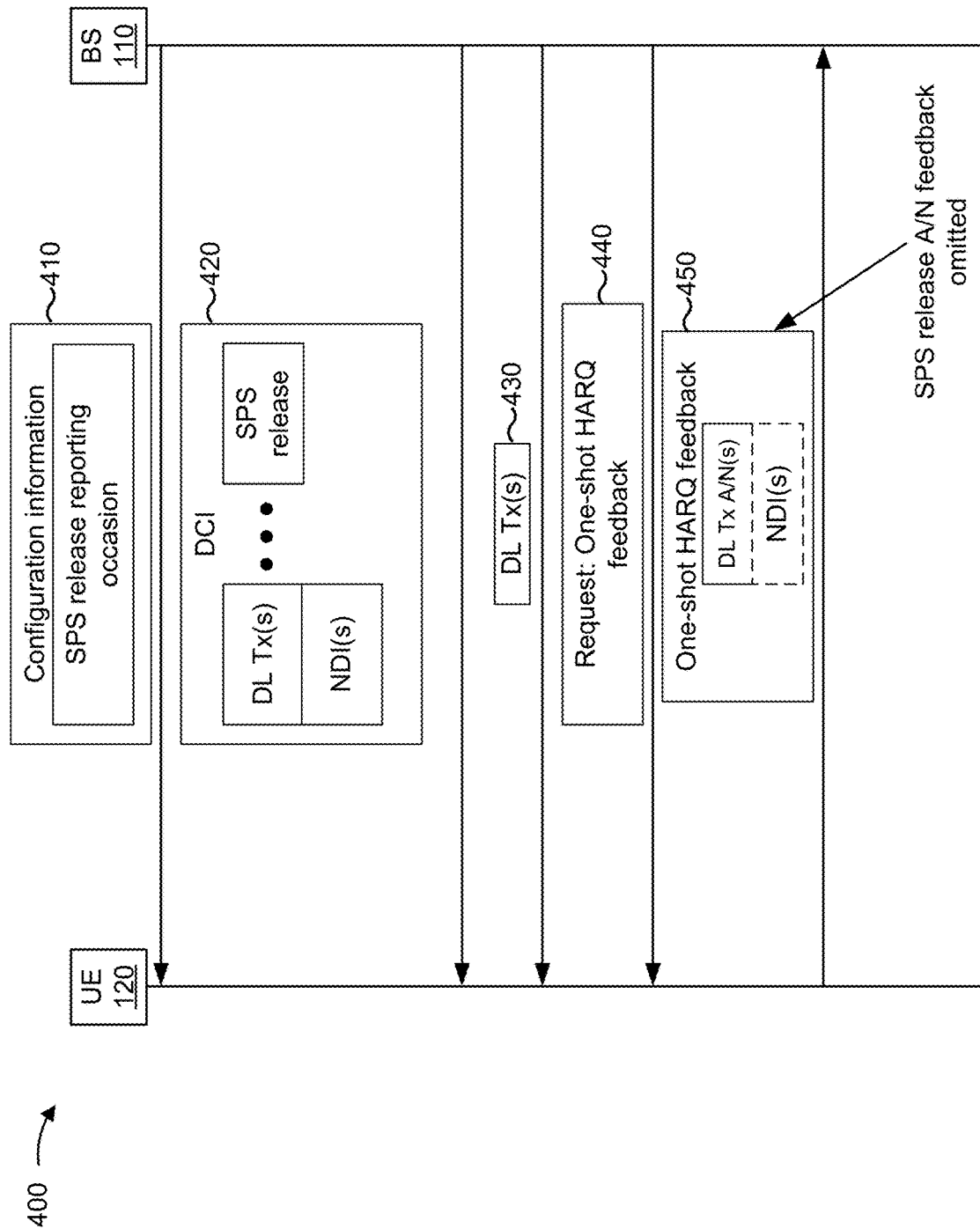
FIG. 4 is a diagram illustrating an example of reporting of one-shot HARQ feedback in connection with a semi-persistent scheduling (SPS) release.

FIG. 4 is a diagram illustrating an example 400 of reporting of one-shot HARQ feedback in connection with an SPS release. As shown, the example 400 includes a UE 120 and a BS 110 (such as the UE 120 and the BS 110 depicted in, and described in connection with, FIGS. 1-3).

As shown by reference number 410, the UE 120 may receive configuration information from the BS 110. The configuration information may configure a reporting occasion for an SPS release. For example, an SPS is a repeating resource allocation in which a wireless communication device may receive or transmit a communication. An SPS may be activated, for example, via DCI. An SPS also may be released via DCI, which is referred to herein as an SPS release. The BS 110 may configure a reporting occasion associated with an SPS release. The UE 120 may provide feedback (an ACK/NACK) regarding the SPS release on the reporting occasion. For example, the SPS release may be associated with a HARQ process identifier, such as HARQ process 0. However, in some cases (as in example 400), the UE 120 may receive a request for one-shot HARQ feedback regarding all HARQ processes of the UE 120. Thus, there may be ambiguity as to how the UE 120 may handle one-shot HARQ feedback reporting when the UE 120 is also configured with an SPS release that is associated with a HARQ process identifier. FIG. 4 shows an example where the UE 120 does not report an ACK/NACK for an SPS release as part of one-shot HARQ feedback, as described herein.

As shown by reference number 420, the BS 110 may transmit DCI scheduling one or more downlink transmissions (DL Tx). As further shown, the DCI that schedules the one or more downlink transmissions may be associated with a respective NDI. As further shown, the DCI also may indicate an SPS release for the SPS configured by the configuration information. In some aspects, the DCI scheduling the one or more downlink transmissions and the DCI releasing the SPS may be transmitted separately from one another.

As shown by reference number 430, the BS 110 may transmit the one or more downlink transmissions. For example, the BS 110 may transmit the one or more downlink transmissions using respective resource allocations indicated by the DCI. As shown by reference number 440, the BS 110 may transmit a request for one-shot HARQ feedback. In example 400, the request for one-shot HARQ feedback is for all HARQ processes associated with the plurality of downlink transmissions. In some aspects, the request for one-shot HARQ feedback may be for a subset of the HARQ processes associated with the plurality of downlink transmissions, such as one or more HARQ processes.

As shown by reference number 450, the UE 120 may transmit one-shot HARQ feedback for the one or more downlink transmissions. For example, the UE 120 may transmit the one-shot HARQ feedback for the plurality of HARQ processes associated with the plurality of downlink transmissions. In some aspects, the one-shot HARQ feedback may indicate respective NDIs associated with the plurality of downlink transmissions, as described in more detail in connection with FIG. 3. As further shown, the one-shot HARQ feedback does not include an ACK/NACK for the SPS release. For example, the UE 120 may cancel transmission of the one-shot HARQ feedback associated with the SPS release, or may generate one-shot HARQ feedback for the one or more downlink transmissions that does not include an ACK/NACK for the SPS release. The UE 120 may omit the ACK/NACK for the SPS release based on the UE 120 being configured with a reporting occasion for the SPS release. Thus, the UE 120 may resolve ambiguity in reporting of ACK/NACKs for SPS releases, and may conserve communication resources associated with redundant scheduling of SPS release reporting occasions and one-shot HARQ feedback resources for an SPS release.

Figure 5:
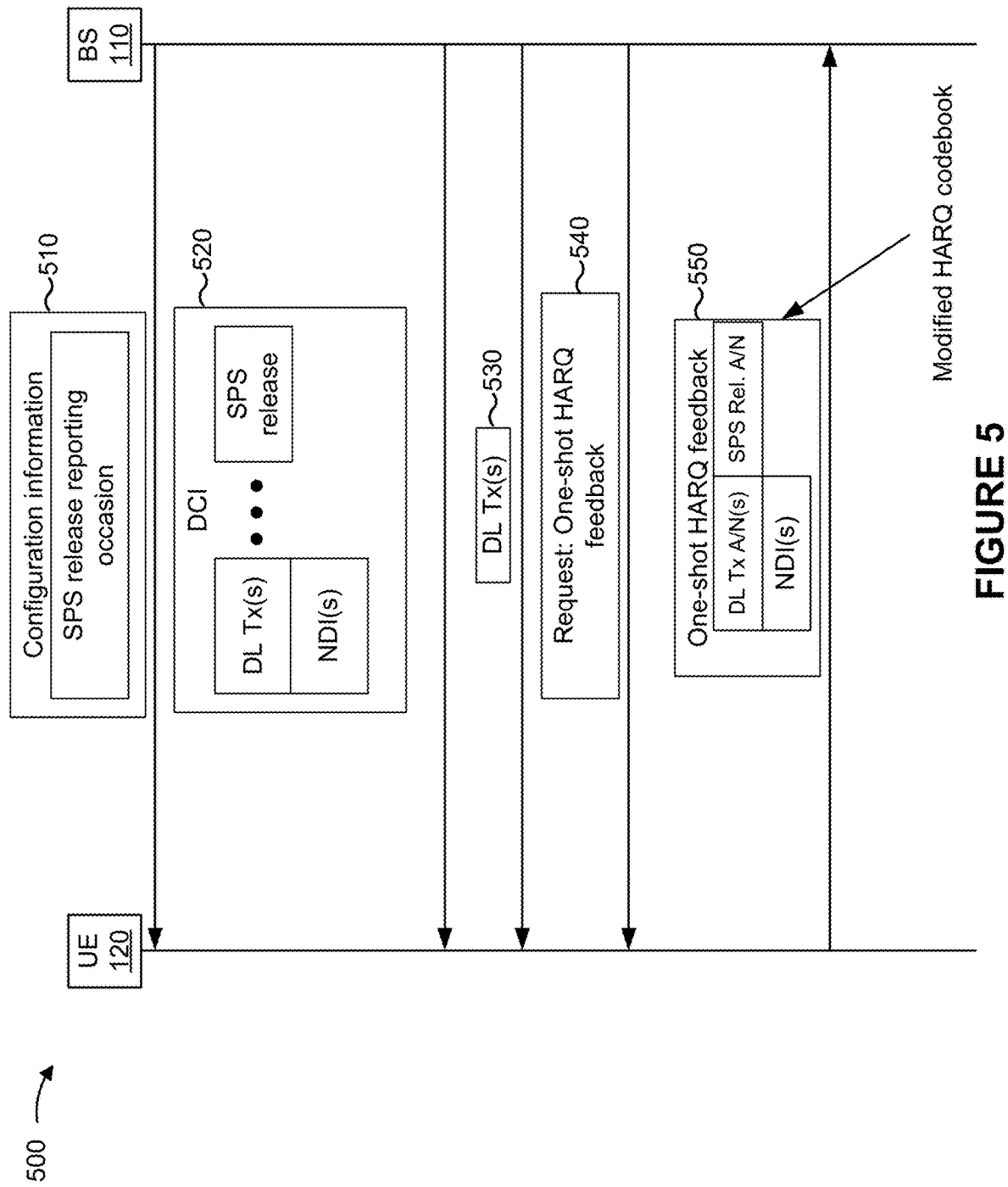
FIG. 5 is a diagram illustrating an example of reporting of one-shot HARQ feedback in connection with an SPS release

FIG. 5 is a diagram illustrating an example 500 of reporting of one-shot HARQ feedback in connection with an SPS release. As shown, the example 500 includes a UE 120 and a BS 110 (such as the UE 120 and the BS 110 depicted in, and described in connection with, FIGS. 1-4).

As shown by reference number 510, the UE 120 may receive configuration information from the BS 110. The configuration information may configure a reporting occasion for an SPS release. As described in more detail in connection with FIG. 3, there may be ambiguity as to how the UE 120 may handle one-shot HARQ feedback reporting when the UE 120 is also configured with an SPS release that is associated with a HARQ process identifier. FIG. 5 shows an example where the UE 120 reports an ACK/NACK for an SPS release using a modified HARQ codebook associated with one-shot HARQ feedback, as described herein.

As shown by reference number 520, the BS 110 may transmit DCI scheduling one or more downlink transmissions (DL Tx). As further shown, the DCI that schedules the one or more downlink transmissions may be associated with a respective NDI. As further shown, the DCI also may indicate an SPS release for the SPS configured by the configuration information. In some aspects, the DCI scheduling the one or more downlink transmissions and the DCI releasing the SPS may be transmitted separately from one another.

As shown by reference number 530, the BS 110 may transmit the one or more downlink transmissions. For example, the BS 110 may transmit the one or more downlink transmissions using respective resource allocations indicated by the DCI. As shown by reference number 540, the BS 110 may transmit a request for one-shot HARQ feedback. In example 500, the request for one-shot HARQ feedback is for all HARQ processes associated with the plurality of downlink transmissions. In some aspects, the request for one-shot HARQ feedback may be for a subset of the HARQ processes associated with the plurality of downlink transmissions, such as one or more HARQ processes.

As shown by reference number 550, the UE 120 may transmit one-shot HARQ feedback for the one or more downlink transmissions. For example, the UE 120 may transmit the one-shot HARQ feedback for the plurality of HARQ processes associated with the plurality of downlink transmissions. In some aspects, the one-shot HARQ feedback may indicate respective NDIs associated with the plurality of downlink transmissions, as described in more detail in connection with FIG. 3. As further shown, the one-shot HARQ feedback may indicate an ACK/NACK for the SPS release. For example, the UE 120 may append a bit to a HARQ codebook used to provide one-shot ACK/NACK feedback. A first value of the bit may indicate an ACK for the SPS release and a second value of the bit may indicate a NACK for the SPS release.

In some aspects, the UE 120 may determine a value of the ACK/NACK based on whether the UE 120 has already reported the SPS release. For example, the UE may set a value of the ACK/NACK for the SPS release to NACK if the UE 120 has already reported an ACK for the same SPS release in a prior SPS release reporting occasion. If an LBT operation fails for the transmission of the one-shot HARQ feedback, the UE 120 may set the value of the ACK/NACK to ACK until a first successful transmission of the one-shot HARQ feedback.

In some aspects, the UE 120 may determine a value of the ACK/NACK based on a slot in which the SPS is released. For example, the UE 120 may report an ACK if the DCI releasing the SPS is detected and indicates (such as points to) the same slot as the one for reporting one-shot ACK/NACK. Otherwise, the UE 120 may report a NACK.

In some aspects, the UE 120 may use a toggle-based method to determine a value of the ACK/NACK. For example, for any detected DCI that corresponds to an SPS release, the UE 120 may toggle the value of the ACK/NACK. If another SPS release DCI is detected before a next one-shot HARQ feedback, the UE 120 may toggle the bit in the next one-shot HARQ feedback. If another SPS release is not detected before the next one-shot HARQ feedback, the UE 120 may not toggle the bit (for example, may transmit the bit with a same value in two consecutive one-shot HARQ feedback messages). In this case, the BS 110 may determine whether the SPS release is received by the UE 120.

In some aspects, the UE 120 may transmit the ACK/NACK with the HARQ codebook for a number of slots after receiving the DCI. For example, the UE 120 may transmit the bit appended to the HARQ codebook for the first M slots (where M is a number greater than zero) after DCI detection, and then may drop the bit irrespective of a reported status of the SPS release.

FIG. 6 is a diagram illustrating an example process 600 performed, for example, by a UE. The example process 600 shows where the UE (such as UEs 120*a*-120*e* or the UE 120 depicted in, and described in connection with, FIGS. 1-5) performs operations associated with configuration for one-shot hybrid automatic repeat request (HARQ) feedback.

As shown in FIG. 6, in some aspects, the example process 600 may include receiving an indication of whether a new data indicator (NDI) is to be provided in connection with one-shot hybrid automatic repeat request (HARQ) feedback triggered for a HARQ process (block 610). For example, the UE (such as using antenna 252, DEMOD 254, MIMO detector 256, receive processor 258, controller/processor 280, a first interface, or the like) may receive or obtain an indication of whether an NDI is to be provided in connection with one-shot HARQ feedback triggered for a HARQ process, as described herein.

As shown in FIG. 6, in some aspects, the example process 600 may include selectively providing the NDI with the one-shot HARQ feedback in accordance with the indication (block 620). For example, the UE (such as using controller/processor 280, transmit processor 264, TX MIMO processor 266, MOD 254, antenna 252, a processing system, or the like) may selectively provide the NDI with the one-shot HARQ feedback in accordance with the indication, as described herein.

The example process 600 may include additional aspects, such as any single aspect or any combination of aspects described below or in connection with one or more other processes described elsewhere herein.

In a first aspect, the indication is received in radio resource control (RRC) information.

In a second aspect, alone or in combination with the first aspect, the indication is received in a medium access control (MAC) control element (CE).

In a third aspect, alone or in combination with one or more of the first and second aspects, the indication is received in a grant associated with a transmission for which the one-shot HARQ feedback is provided.

In a fourth aspect, alone or in combination with one or more of the first through third aspects, the indication indicates that the NDI is to be carried in a physical uplink shared channel.

In a fifth aspect, alone or in combination with one or more of the first through fourth aspects, the indication indicates that the NDI is to be carried in a physical uplink control channel.

In a sixth aspect, alone or in combination with one or more of the first through fifth aspects, the indication indicates a carrier or bandwidth part for which the NDI is to be provided.

In a seventh aspect, alone or in combination with one or more of the first through sixth aspects, the indication indicates that the NDI is to be provided when a threshold number of carriers is activated for the UE.

In an eighth aspect, alone or in combination with one or more of the first through seventh aspects, the indication indicates that the NDI is to be provided when a threshold number of unlicensed carriers is activated for the UE.

In a ninth aspect, alone or in combination with one or more of the first through eighth aspects, the indication indicates that the NDI is to be provided for a type of uplink shared channel.

In a tenth aspect, alone or in combination with one or more of the first through ninth aspects, the indication indicates that the NDI is to be provided for a format of uplink shared channel.

In an eleventh aspect, alone or in combination with one or more of the first through tenth aspects, the indication indicates that the NDI is to be provided for one or more HARQ configurations.

In a twelfth aspect, alone or in combination with one or more of the first through eleventh aspects, the indication indicates that the NDI is to be provided when the UE is configured with a rank that is lower than a threshold.

Although FIG. 6 shows two blocks of the example process 600, in some aspects, the example process 600 may include additional blocks, fewer blocks, different blocks, or differently arranged blocks than those depicted in FIG. 6. Additionally, or alternatively, two or more of the blocks of the example process 600 may be performed in parallel.

FIG. 7 is a diagram illustrating an example process 700 performed, for example, by a UE. The example process 700 is an example where the UE (such as UEs 120a-120e or the UE 120 depicted in, and described in connection with, FIGS. 1-6) performs operations associated with configuration for one-shot HARQ feedback.

As shown in FIG. 7, in some aspects, the example process 700 may include receiving a request for one-shot HARQ feedback, where the UE is configured with a reporting occasion for a SPS release (block 710). For example, the UE (such as using antenna 252, DEMOD 254, MIMO detector 256, receive processor 258, controller/processor 280, a first interface, or the like) may receive or obtain a request for one-shot HARQ feedback, as described herein. In some aspects, the UE is configured with a reporting occasion for an SPS release.

As shown in FIG. 7, in some aspects, the example process 700 may include transmitting the one-shot HARQ feedback based on the UE being configured with the reporting occasion for the SPS release (block 720). For example, the UE (such as using controller/processor 280, transmit processor 264, TX MIMO processor 266, MOD 254, antenna 252, the first interface, a second interface, or the like) may transmit or output the one-shot HARQ feedback based on the UE being configured with the reporting occasion for the SPS release, as described herein. In some implementations, the one-shot HARQ feedback may omit feedback regarding the SPS release based on the UE being configured with the reporting occasion for the SPS release.

As shown in FIG. 7, in other aspects, the example process 700 may include performing the one-shot HARQ feedback using a modified codebook based on the UE being configured with the SPS release (block 730). For example, the UE (such as using controller/processor 280, transmit processor 264, TX MIMO processor 266, MOD 254, antenna 252, the first interface, the second interface, or the like) may perform the one-shot HARQ feedback using a modified codebook based on the UE being configured with the SPS release, as described herein.

The example process 700 may include additional aspects, such as any single aspect or any combination of aspects described below or in connection with one or more other processes described elsewhere herein.

In a first aspect, a bit is appended to a semi-static HARQ feedback codebook to form the modified codebook.

In a second aspect, alone or in combination with the first aspect, the bit is toggled based on the SPS release having been detected by the UE.

In a third aspect, alone or in combination with one or more of the first and second aspects, the bit is used for a number of slots after the SPS release is detected.

In a fourth aspect, alone or in combination with one or more of the first through third aspects, the one-shot HARQ feedback indicates a negative acknowledgment if the UE has already reported HARQ feedback for the SPS release using the reporting occasion.

In a fifth aspect, alone or in combination with one or more of the first through fourth aspects, the one-shot HARQ feedback includes an acknowledgment based on the SPS release being detected and based on the reporting occasion being included in a same slot as a reporting occasion of the one-shot HARQ feedback.

In a sixth aspect, alone or in combination with one or more of the first through fifth aspects, the process 700 includes outputting the one-shot HARQ feedback omitting feedback regarding the SPS release based on the UE being configured with the reporting occasion for the SPS release.

Although FIG. 7 shows three blocks of the example process 700, in some aspects, the example process 700 may include additional blocks, fewer blocks, different blocks, or differently arranged blocks than those depicted in FIG. 7. Additionally, or alternatively, two or more of the blocks of process the example 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based on."

As used herein, "satisfying a threshold" may refer to a value being greater than the threshold, greater than or equal to the threshold, less than the threshold, less than or equal to the threshold, equal to the threshold, not equal to the threshold, or the like.

As used herein, a phrase referring to "at least one of a list of" items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
receiving an indication of whether a new data indicator (NDI) is to be provided with one-shot hybrid automatic repeat request (HARQ) feedback for a HARQ process, wherein the indication is received in radio resource control (RRC) information; and
providing the NDI with the one-shot HARQ feedback for the HARQ process in accordance with the indication.

2. The method of claim 1, wherein the indication indicates that the NDI is to be carried in a physical uplink shared channel.

3. The method of claim 1, wherein the indication indicates that the NDI is to be carried in a physical uplink control channel.

4. The method of claim 1, wherein the indication indicates a carrier or a bandwidth part for which the NDI is to be provided.

5. The method of claim 1, wherein the indication indicates that the NDI is to be provided when a threshold number of carriers is activated for the UE.

6. The method of claim 1, wherein the indication indicates that the NDI is to be provided when a threshold number of unlicensed carriers is activated for the UE.

7. The method of claim 1, wherein the indication indicates that the NDI is to be provided for one or more HARQ configurations.

8. The method of claim 1, wherein the indication indicates that the NDI is to be provided for at least one of a type of uplink shared channel or a format of uplink shared channel.

9. An apparatus of a user equipment (UE) for wireless communication, comprising:
a first interface configured to:
obtain an indication of whether a new data indicator (NDI) is to be provided with one-shot hybrid automatic repeat request (HARQ) feedback for a HARQ process,
wherein the indication is received in radio resource control (RRC) information; and
a processing system configured to provide the NDI with the one-shot HARQ feedback for the HARQ process in accordance with the indication.

10. The apparatus of claim 9, wherein the indication indicates that the NDI is to be carried in one of a physical uplink shared channel (PUSCH) or a physical uplink control channel (PUCCH).

11. The apparatus of claim 9, wherein the indication indicates a carrier or a bandwidth part for which the NDI is to be provided.

12. The apparatus of claim 9, wherein the indication indicates that the NDI is to be provided when a threshold number of carriers is activated for the UE.

13. The apparatus of claim 9, wherein the indication indicates that the NDI is to be provided when a threshold number of unlicensed carriers is activated for the UE.

14. The apparatus of claim 9, wherein the indication indicates that the NDI is to be provided for at least one of a type of uplink shared channel or a format of uplink shared channel.

15. The apparatus of claim 9, wherein the indication indicates that the NDI is to be provided for one or more HARQ configurations.

16. A non-transitory computer-readable medium storing a set of instructions for wireless communication, the set of instructions comprising:
one or more instructions that, when executed by one or more processors of a user equipment (UE), cause the UE to:
receive an indication of whether a new data indicator (NDI) is to be provided with one-shot hybrid automatic repeat request (HARQ) feedback for a HARQ process,
wherein the indication is received in radio resource control (RRC) information; and
provide the NDI with the one-shot HARQ feedback for the HARQ process in accordance with the indication.

17. The non-transitory computer-readable medium of claim 16, wherein the indication indicates that the NDI is to be carried in a physical uplink shared channel.

18. The non-transitory computer-readable medium of claim 16, wherein the indication indicates that the NDI is to be carried in a physical uplink control channel.

19. The non-transitory computer-readable medium of claim 16, wherein the indication indicates that the NDI is to be provided for a type of uplink shared channel.

20. The non-transitory computer-readable medium of claim 16, wherein the indication indicates that the NDI is to be provided for a format of uplink shared channel.

21. The non-transitory computer-readable medium of claim 16, wherein the indication indicates that the NDI is to be provided for one or more HARQ configurations.

22. The non-transitory computer-readable medium of claim 16, wherein the indication indicates a carrier or a bandwidth part for which the NDI is to be provided.

23. The non-transitory computer-readable medium of claim 16, wherein the indication indicates that the NDI is to be provided when a threshold number of carriers is activated for the UE.

24. The non-transitory computer-readable medium of claim 16, wherein the indication indicates that the NDI is to be provided when a threshold number of unlicensed carriers is activated for the UE.

25. An apparatus for wireless communication, comprising:
means for receiving an indication of whether a new data indicator (NDI) is to be provided with one-shot hybrid automatic repeat request (HARQ) feedback for a HARQ process,
wherein the indication is received in radio resource control (RRC) information; and
means for providing the NDI with the one-shot HARQ feedback for the HARQ process in accordance with the indication.

26. The apparatus of claim 25, wherein the indication indicates that the NDI is to be carried in a physical uplink shared channel.

27. The apparatus of claim 25, wherein the indication indicates that the NDI is to be carried in a physical uplink control channel.

28. The apparatus of claim 25, wherein the indication indicates that the NDI is to be provided for a type of uplink shared channel.

29. The apparatus of claim 25, wherein the indication indicates that the NDI is to be provided for a format of uplink shared channel.

30. The apparatus of claim 25, wherein the indication indicates that the NDI is to be provided for one or more HARQ configurations.

* * * * *